(12) United States Patent
Song et al.

(10) Patent No.: US 7,861,032 B2
(45) Date of Patent: Dec. 28, 2010

(54) DATA STORAGE SYSTEM INCLUDING RESPECTIVE BUFFERS FOR NON-VOLATILE MEMORY AND DISC RECORDING MEDIUM, AND DATA ACCESS METHOD THEREOF

(75) Inventors: Dong-hyun Song, Yongin-si (KR);
Hye-jeong Nam, Seongnam-si (KR);
Shea-yun Lee, Gangnam-gu (KR);
Jae-hyun Hwang, Seocho-gu (KR);
Sung-pack Hong, Suwon-si (KR);
Young-joon Choi, Seongnam-si (KR);
Dong-gi Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1031 days.

(21) Appl. No.: 11/644,954

(22) Filed: Dec. 26, 2006

(65) Prior Publication Data
US 2008/0126694 A1  May 29, 2008

(30) Foreign Application Priority Data
Nov. 3, 2006  (KR) ...................... 10-2006-0108380

(51) Int. Cl.
*G06F 12/00* (2006.01)

(52) U.S. Cl. ............................... 711/112; 711/E12.019

(58) Field of Classification Search ................. 711/112, 711/E12.019
See application file for complete search history.

(56) References Cited

U.S. PATENT DOCUMENTS

| 5,666,512 | A | 9/1997 | Nelson et al. |
| 6,243,795 | B1 | 6/2001 | Yang et al. |
| 7,411,757 | B2 * | 8/2008 | Chu et al. ............ 711/E12.019 |

FOREIGN PATENT DOCUMENTS

KR    1020040071446 A    8/2004

* cited by examiner

*Primary Examiner*—Pierre-Michel Bataille
(74) *Attorney, Agent, or Firm*—Volentine & Whitt, PLLC

(57) ABSTRACT

A data storage system includes a non-volatile memory, a disc recording medium, a non-volatile memory buffer, operatively disposed between a host interface and the non-volatile memory, which stores a portion of data stored in the non-volatile memory, and a disc buffer, operatively disposed between the host interface and the disc recording medium, which stores a portion of data stored in the disc recording medium. The data storage system may be configured to receive an access address from a host operatively connected to the host interface, and sequentially determine whether the access address exists in one of the non-volatile memory buffer, the non-volatile memory, the disc buffer, and the disc recording medium, in that order.

13 Claims, 3 Drawing Sheets

DATA STORAGE SYSTEM INCLUDING RESPECTIVE BUFFERS FOR NON-VOLATILE MEMORY AND DISC RECORDING MEDIUM, AND DATA ACCESS METHOD THEREOF

BACKGROUND OF THE INVENTION

1. Field of the Invention

The present invention generally relates to a data storage system and a data access method, and more particularly, the present invention relates to a data storage system which includes separate buffers for a non-volatile memory and a disc recording medium, and to a data access method performed by the data storage system.

A claim of priority is made to Korean Patent Application No. 10-2006-0108380, filed on Nov. 3, 2006, in the Korean Intellectual Property Office, the disclosure of which is incorporated herein by reference in its entirety.

2. Description of the Related Art

In conventional data storage systems which include both a non-volatile memory and a disc recording medium, the non-volatile memory and the disc recording medium share a common buffer. When a read command is received from a host, conventional data storage systems search for a read address associated with the read command within the common shared buffer, and then search for the read address within the non-volatile memory and the disc recording medium.

Conventional data storage systems of this type necessarily require the provision of a relatively large common buffer. For at least this reason, substantial time may be needed to execute search and read processes.

SUMMARY OF THE INVENTION

According to an aspect of the present invention, a data storage system is provided which includes a non-volatile memory, a disc recording medium, a non-volatile memory buffer, operatively disposed between a host interface and the non-volatile memory, which stores a portion of data stored in the non-volatile memory, and a disc buffer, operatively disposed between the host interface and the disc recording medium, which stores a portion of data stored in the disc recording medium.

According to another aspect of the present invention, a data access method is provided which is executed by a data storage system. The data storage system includes a non-volatile memory, a non-volatile memory buffer which stores a plurality of memory blocks corresponding to a plurality of internal storage areas of the non-volatile memory, a disc recording medium, and a disc buffer which stores a plurality of memory blocks corresponding to a plurality of internal storage areas of the disc recording medium. The data access method includes sequentially determining whether a requested access address exists in one of the non-volatile memory buffer, the non-volatile memory, the disc buffer, and the disc recording medium, in that order.

According to another aspect of the present invention, a data access method is provided which is executed by a data storage system. The data storage system includes a non-volatile memory, a non-volatile memory buffer which stores a plurality of memory blocks corresponding to a plurality of internal storage areas of the non-volatile memory, a disc recording medium, and a disc buffer which stores a plurality of memory blocks corresponding to a plurality of internal storage areas of the disc recording medium. The data access method includes determining whether a requested access address exists in the non-volatile memory buffer, and then if the access address does not exist in the non-volatile memory buffer, determining whether the access address exists in the non-volatile memory, and then if the access address does not exist in the non-volatile memory, determining whether the access address exists in the disc buffer, and then if the access address does not exist in the disc buffer, determining whether the access address exists in the disc recording medium.

BRIEF DESCRIPTION OF THE DRAWINGS

The above and other features and advantages of the present invention will become readily apparent from the detailed description that follows, with reference to the accompanying drawings, in which.

DETAILED DESCRIPTION OF EMBODIMENTS

Hereinafter, the present invention will be described in detail with reference to preferred but non-limiting embodiments of the invention and with reference to the attached drawings. The drawings are presented for illustrative reasons only, and are not intended to limit the scope of the invention.

Figure 1:
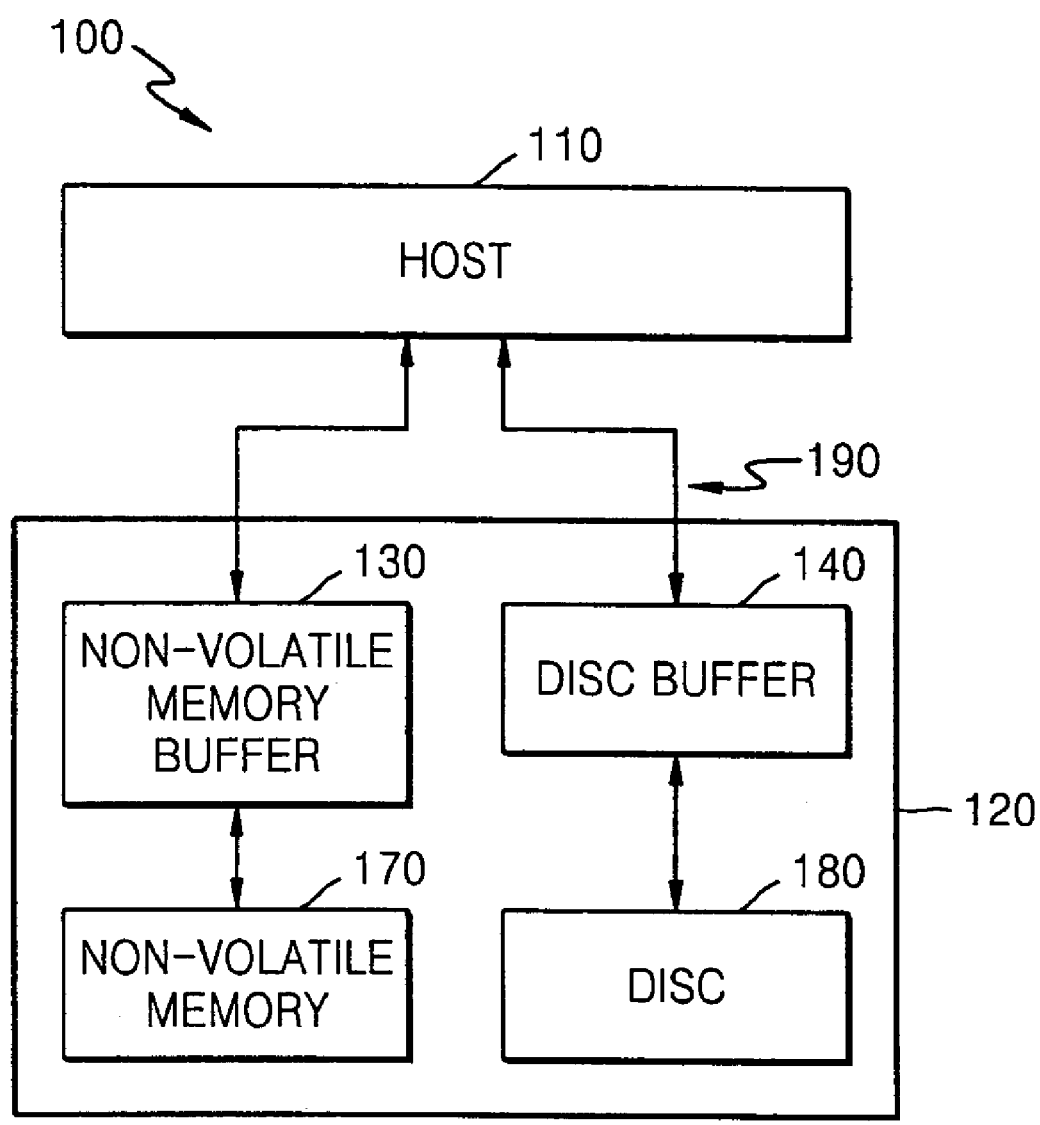
FIG. 1 is a block diagram of a data storage system according to an embodiment of the present invention.

FIG. 1 is a block diagram of a processing system 100. As shown, processing system 100 includes a host device (e.g., host processor, etc.) 110 and a data storage system 120 according to an embodiment of the present invention.

The data storage system 120 includes a host interface 190, a non-volatile memory (e.g., flash memory) 170, a disc recording medium 180, a non-volatile memory buffer 130, and a disc buffer 140. The host interface 190 of the data storage system 120 is operatively connected to the host device 110.

The non-volatile memory buffer 130 is operatively disposed between the host interface 190 and the non-volatile memory 170, and functions to store selected portions of the data stored in (or to be stored in) the non-volatile memory 170. Likewise, the disc buffer 140 is operatively disposed between the host interface 190, and functions to store selected portions of the data stored in (or to be stored in) the disc recording medium 180.

In particular, the non-volatile memory buffer 130 and the disc buffer 140 store frequently accessed portions of the data contained in (or to be written in) the non-volatile memory 170 and the disc buffer 180. In this manner, as described in more detailed later herein, a data read/write speed can be enhanced.

In a read operation, when the data storage system 120 receives an access address, a sequential address search routine is executed in which the access address is searched among existing addresses of the non-volatile memory buffer 130, the non-volatile memory 170, the disc buffer 140, and the disc recording medium 180, in that order. In other words, existing addresses of the non-volatile memory buffer 130 are searched prior to searching existing address of the non-volatile memory 170; existing addresses of the non-volatile memory 170 are searched prior to searching existing address of the disc buffer 140; and existing addresses of the disc buffer 140 are searched prior to searching existing address of the disc recording medium 180. The sequential address search routine is terminated upon finding an existing address which corresponds to the access address, and the data corresponding to that existing address is retrieved from the corresponding one of the non-volatile memory buffer 130, the non-volatile memory 170, the disc buffer 140, and the disc recording medium 180. If not match is found after finally searching addresses of the disc recording medium 180, an error signal is generated.

Figure 2:
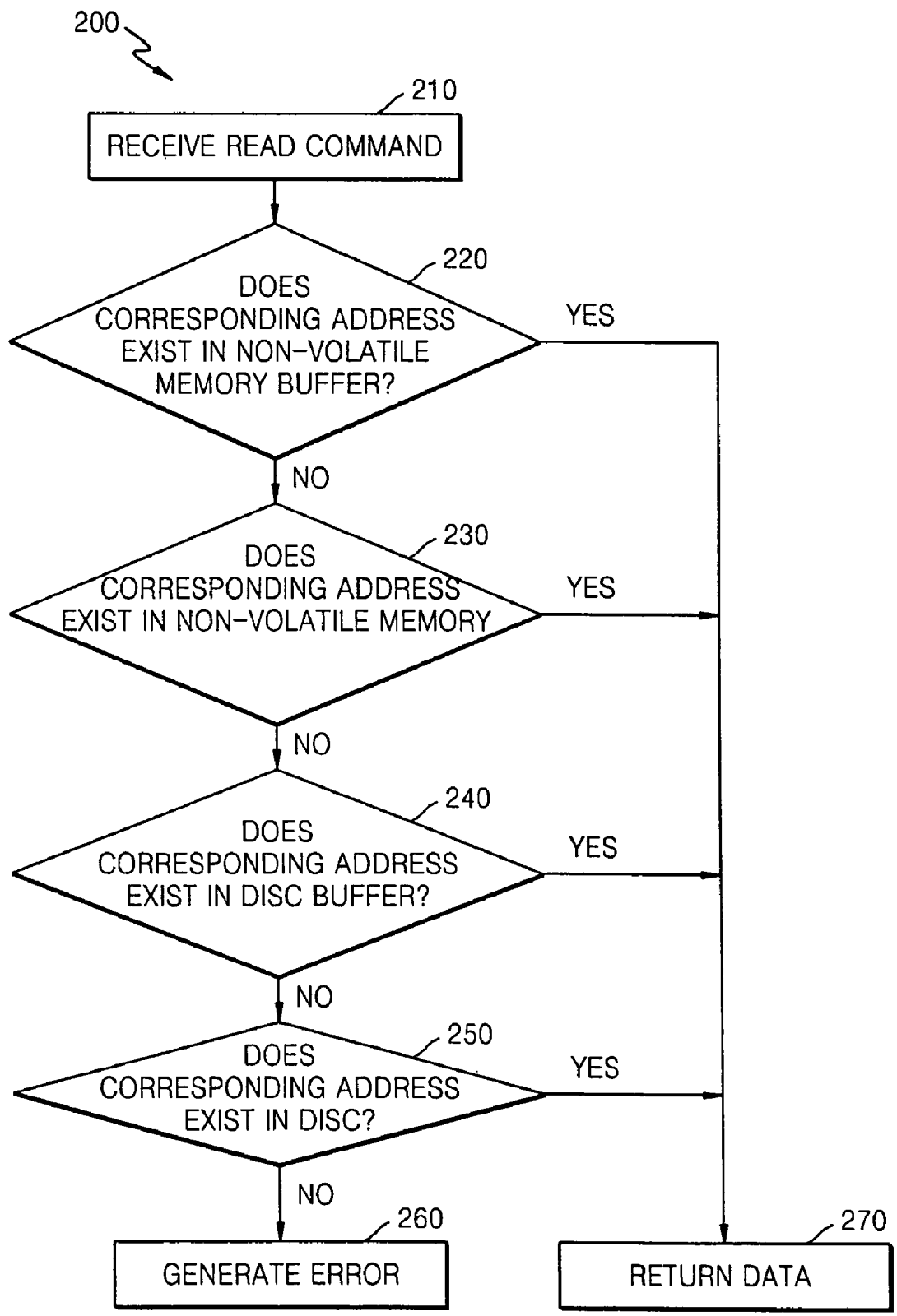
FIG. 2 is a flowchart illustrating a data access method performed by the data storage system illustrated in FIG. 1, according to an embodiment of the present invention.

FIG. 2 is a flowchart for describing a data access method 200 performed by the processing system 100 illustrated in FIG. 1, according to an embodiment of the present invention.

When a specific access address is requested from the host device 110 (operation 210), a determination is first made as to whether the access address exists in the non-volatile memory buffer 130 (operation 220). If the access address exists in the non-volatile memory buffer 130, that is, if an address "hit" occurs, the non-volatile memory buffer 130 returns data corresponding to the access address to the host device 110 (operation 270). If the access address does not exist in the non-volatile memory buffer 130, that is, if an address "miss" occurs, as determination is then made as to whether the access address exists in the non-volatile memory 170 (operation 230).

If the access address exists in the non-volatile memory 170, the non-volatile memory 170 returns data corresponding to the access address to the host device 110 (operation 270). If the access address does not exist in the non-volatile memory 170, a determination is then made as to whether the address exists in the disc buffer 140 (operation 240).

If the access address exists in the disc buffer 140, the disc buffer 140 returns data corresponding to the access address to the host device 110 (operation 270). If the access address does not exist in the disc buffer 140, a determination is then made as to whether the access address exists in the disc recording medium 180 (operation 250).

If the access address exists in the disc recording medium 180, the disc recording medium 180 returns data corresponding to the access address to the host device 110 (operation 270). If the access address does not exist in the disc recording medium 180, an error signal is generated (operation 260).

Equations 1 represents data access times associated with the data access method 200 of FIG. 2.

$$T1 = Tfbs + Tx$$
$$T2 = Tfbs + Tfs + Tfr + Tx$$
$$T3 = Tfbs + Tfs + Tdbs + Tx$$
$$T4 = Tfbs + Tfs + Tdbs + Tds + Tdr + Tx \tag{1}$$

where T1 denotes a data access time of the data access method 200 when the access address exists in the non-volatile memory buffer 130, T2 denotes a data access time when the access address exists in the non-volatile memory 170, T3 denotes a data access time when the access address exists in the disc buffer 140, and T4 denotes a data access time when the access address exists in the disc 180. In equations T1~T4, Tx denotes a communication time between the data storage system 120 and the host device 110, Tfbs denotes a data search time of the non-volatile memory buffer 130, Tfs denotes a data search time of the non-volatile memory 170, Tfr denotes a data access time of the non-volatile memory 170, Tdbs denotes a data search time of the disc buffer 140, Tds denotes a data search time of the disc recording medium 180, and Tdr denotes a data access time of the disc recording medium 180.

Equation 2 represents data access time associated with a conventional data access method.

$$T5 = Tbs(=Tfbs+Tdbs)+Tx$$
$$T6 = Tbs+Tfs+Tfr+Tx$$
$$T7 = Tbs+Tfs+Tds+Tdr+Tx, \tag{2}$$

where T5 denotes a data access time required in the conventional data access method when the access address exists in a common buffer, T6 denotes a data access time when the access address exists in a non-volatile memory, T7 denotes a data access time when the access address exists in a disc recording medium. In equations T5~T7, Tx denotes a communication time between a conventional data storage system and a host device, Tbs denotes a data search time of the common buffer, Tfs denotes a data search time of the non-volatile memory, Tfr denotes a data access time of the non-volatile memory, Tds denotes a data search time of the disc recording medium, and Tdr denotes a data access time of the disc recording medium.

Comparing the data access method according to the present invention with the conventional data access method with reference to Equations 1 and 2, T1<T2 or T2<T5 is satisfied when the access address exists in the non-volatile memory buffer 130 or the non-volatile memory 170.

In the data storage system 120 according to the embodiment of the present invention, the non-volatile memory buffer 130 and the disc buffer 140 can store data of frequently accessed memory blocks of the non-volatile memory 170 and the disc 180. In this case, the processing system 100 may perform read/write operation in the units of memory blocks. The number of memory blocks assigned to the non-volatile memory buffer 130 may be less than the number of memory blocks assigned to the disc buffer 140. For example, in the data storage system 120 according to the present invention, it is possible to assign a maximum number of memory blocks to the disc buffer 140 and assign ten or fewer memory blocks to the non-volatile memory buffer 130. Also, it is possible, for example, to assign 3-5% of the number of memory blocks assigned to the disc buffer 140 to the non-volatile memory buffer 130.

In the data storage system 120, when data is stored in the disc recording medium 180, it is possible to delete data of an address of the non-volatile memory 170 corresponding to an address of the disc recording medium 180 in which the data is stored. Accordingly, if no data exists in a specific address of the non-volatile memory 170, data of an address of the disc recording medium 180 corresponding to the specific address is deemed the newest stored data. On the contrary, if data exists in the specific address of the non-volatile memory 170, the data of the non-volatile memory 170 is deemed the newest stored data. Also, if data exists in both the specific address of the non-volatile memory 170 and the corresponding address of the disc recording medium 180, the data of the non-volatile memory 170 is deemed the newest stored data.

Figure 3:
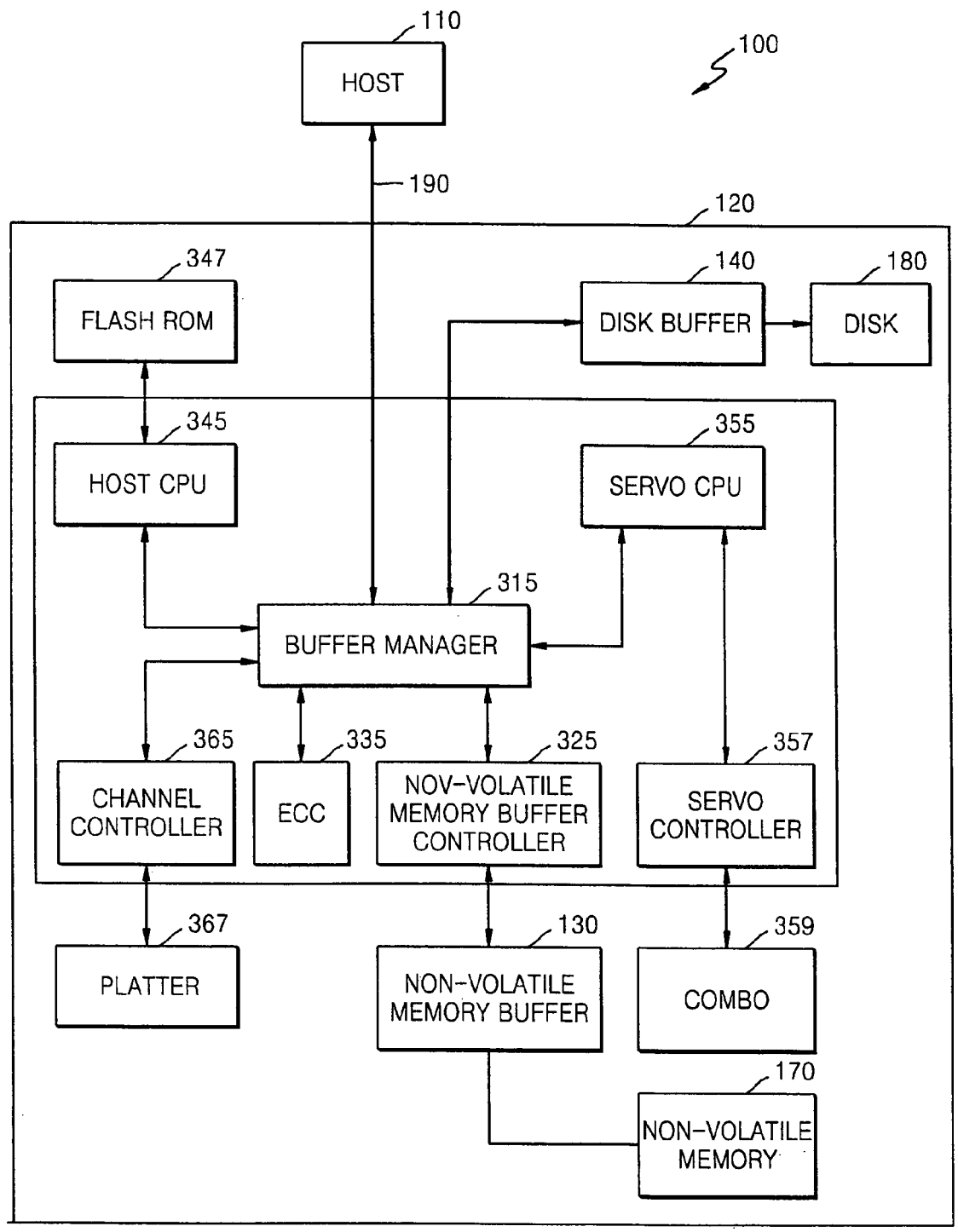
FIG. 3 is a detailed block diagram of the data storage system of FIG. 1.

FIG. 3 is a detailed block diagram of the data storage system 100 of FIG. 1. The data storage system 100 may include a non-volatile memory buffer controller 325. The non-volatile memory buffer controller 325 controls the non-volatile memory buffer 130. Meanwhile, if the functions necessary to use the non-volatile memory buffer 130, e.g., ECC and Auto Page Increment are not implemented in H/W, Or if the non-volatile memory buffer 130 only functions as buffer, it is possible to remove the non-volatile memory buffer controller 325. In this case, host CPU 345 controls the non-volatile memory buffer 130. Host CPU 345 also controls to write and read operation to flash ROM 347. Furthermore, Host CPU 345 controls general operations of the data storage system 100.

The data storage system 100 may include buffer manager 315. The buffer manager 315 may connect the host 110 via the host interface 190. The buffer manager 315 mediates between the host 110 and other elements of the data storage system 100.

A servo CPU 355, servo controller 357 and combo 359 may perform servo operations. ECC 335 may perform ECC operation.

As described above, a data storage system and a data access method according to embodiments of the present invention can realize a reduction in data access time.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A data storage system comprising:
   a non-volatile memory;
   a disc recording medium;
   a non-volatile memory buffer, operatively disposed between a host interface and the non-volatile memory, which stores a portion of data stored in the non-volatile memory; and
   a disc buffer, operatively disposed between the host interface and the disc recording medium, which stores a portion of data stored in the disc recording medium,
   wherein the data storage system is configured to receive an access address from a host operatively connected to the host interface, and sequentially determine whether the access address exists in one of the non-volatile memory buffer, the non-volatile memory, the disc buffer, and the disc recording medium, in that order.

2. The data storage system of claim 1, wherein the data storage system is configured to transmit data corresponding to the access address to the host device when it is determined that the access address exists in one of the non-volatile memory buffer, the non-volatile memory, the disc buffer, and the disc recording medium.

3. The data storage system of claim 2, wherein the data storage system is configured to generate an error signal when it is determined that the access address does not exist in one of the non-volatile memory buffer, the non-volatile memory, the disc buffer, and the disc recording medium.

4. The data storage system of claim 1, wherein the non-volatile memory buffer and the disc buffer store a part of memory blocks of the non-volatile memory and the disc recording medium, respectively.

5. The data storage system of claim 4, wherein the number of memory blocks assigned to the non-volatile memory buffer is less than the number of memory blocks assigned to the disc buffer.

6. The data storage system of claim 1, wherein the data storage system is configured to delete data of an address of the non-volatile memory corresponding to an address of the disc recording medium in which data is stored.

7. A data access method executed by a data storage system, where the data storage system includes a non-volatile memory, a non-volatile memory buffer which stores a plurality of memory blocks corresponding to a plurality of internal storage areas of the non-volatile memory, a disc recording medium, and a disc buffer which stores a plurality of memory blocks corresponding to a plurality of internal storage areas of the disc recording medium, said method comprising sequentially determining whether a requested access address exists in one of the non-volatile memory buffer, the non-volatile memory, the disc buffer, and the disc recording medium, in that order.

8. The data access method of claim 7, further comprising transmitting data corresponding to the access address to a host device when it is determined that the access address exists in one of the non-volatile memory buffer, the non-volatile memory, the disc buffer, and the disc recording medium.

9. The data access method of claim 8, further comprising generating an error signal when it is determined that the access address does not exist in one of the non-volatile memory buffer, the non-volatile memory, the disc buffer, and the disc recording medium.

10. The data access method of claim 7, further comprising receiving the requested access address from a host device.

11. A data access method executed by a data storage system, where the data storage system includes a non-volatile memory, a non-volatile memory buffer which stores a plurality of memory blocks corresponding to a plurality of internal storage areas of the non-volatile memory, a disc recording medium, and a disc buffer which stores a plurality of memory blocks corresponding to a plurality of internal storage areas of the disc recording medium, said method comprising:
   determining whether a requested access address exists in the non-volatile memory buffer; and then
   if the access address does not exist in the non-volatile memory buffer, determining whether the access address exists in the non-volatile memory; and then
   if the access address does not exist in the non-volatile memory, determining whether the access address exists in the disc buffer; and then
   if the access address does not exist in the disc buffer, determining whether the access address exists in the disc recording medium.

12. The data access method of claim 11, further comprising transmitting data corresponding to the access address to a host device when it is determined that the access address exists in one of the non-volatile memory buffer, the non-volatile memory, the disc buffer, and the disc recording medium.

13. The data access method of claim 12, further comprising generating an error signal when it is determined that the access address does not exist in one of the non-volatile memory buffer, the non-volatile memory, the disc buffer, and the disc recording medium.

* * * * *